United States Patent [19]
Dodge

[11] Patent Number: 5,307,780
[45] Date of Patent: May 3, 1994

[54] HEATER FACILITATING COLD ENGINE STARTS

[76] Inventor: James L. Dodge, 375 "A" Owosso Dr., Eugene, Oreg. 97404

[21] Appl. No.: 53,473

[22] Filed: Apr. 29, 1993

[51] Int. Cl.5 .................................................. F01N 5/02
[52] U.S. Cl. ..................................................... 123/556
[58] Field of Search ............... 123/556, 543, 547, 552, 123/546

[56] References Cited

U.S. PATENT DOCUMENTS

| | | | |
|---|---|---|---|
| 2,252,972 | 8/1941 | Grevas | 123/556 |
| 4,413,606 | 11/1983 | Kak et al. | 123/556 |
| 4,461,249 | 7/1984 | Majkrzak | 123/556 |
| 4,548,186 | 10/1985 | Yamaji et al. | 123/556 |
| 4,605,837 | 8/1986 | Chen | 123/556 |
| 4,991,644 | 2/1991 | Miaoulis et al. | 123/556 |
| 5,101,801 | 4/1992 | Schatz | 123/556 |

Primary Examiner—Tony M. Argenbright
Assistant Examiner—M. Macy
Attorney, Agent, or Firm—James D. Givnan, Jr.

[57] ABSTRACT

A heater is disclosed for attachment to a component of an engine to aid in starting of the engine. A housing of the heater receives an encapsulated chemical heat source such as a packet of sodium acetate. The housing is adapted for attachment to various engine components including air filter housings, radiators and directly to an engine by means of fastener elements and a harness respectively. Provision is made for heating air of an initial fuel air mixture, heating of coolant and transmission fluids and the direct heating of an engine.

9 Claims, 1 Drawing Sheet

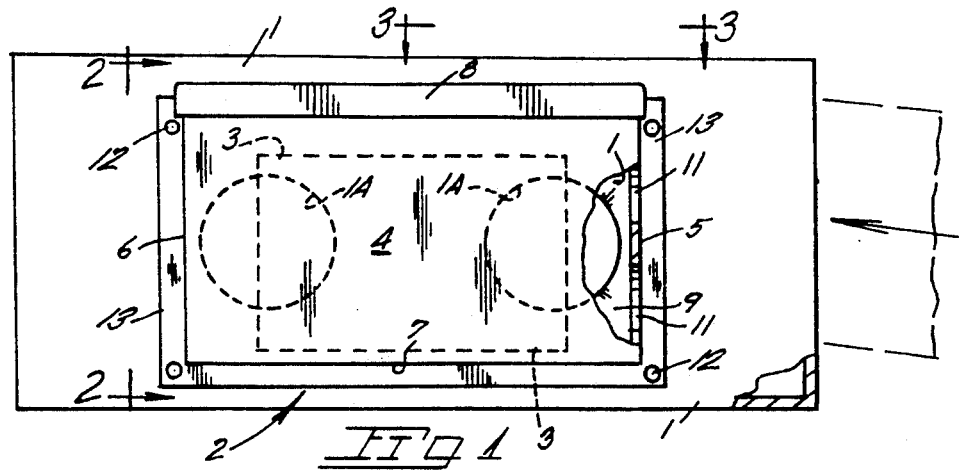
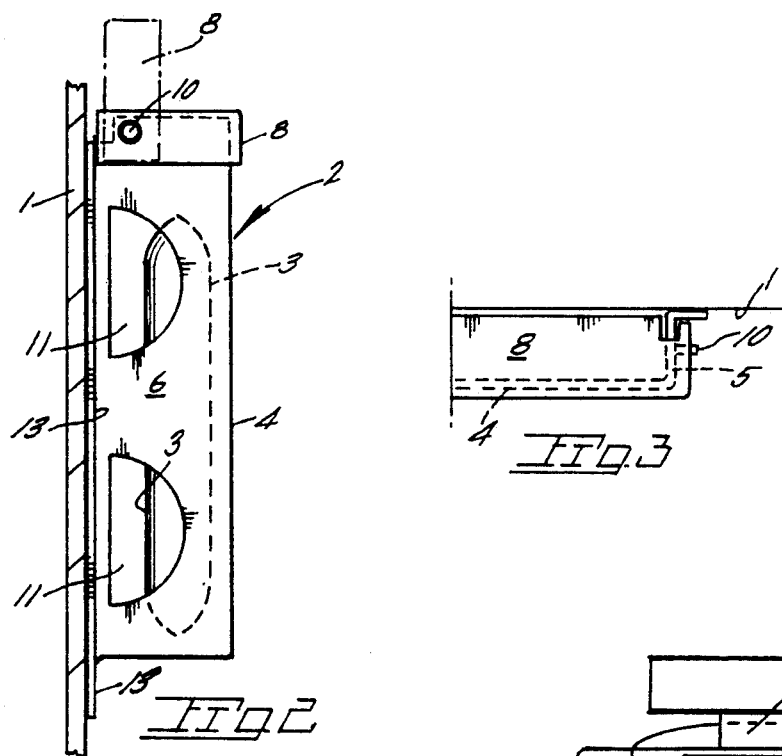
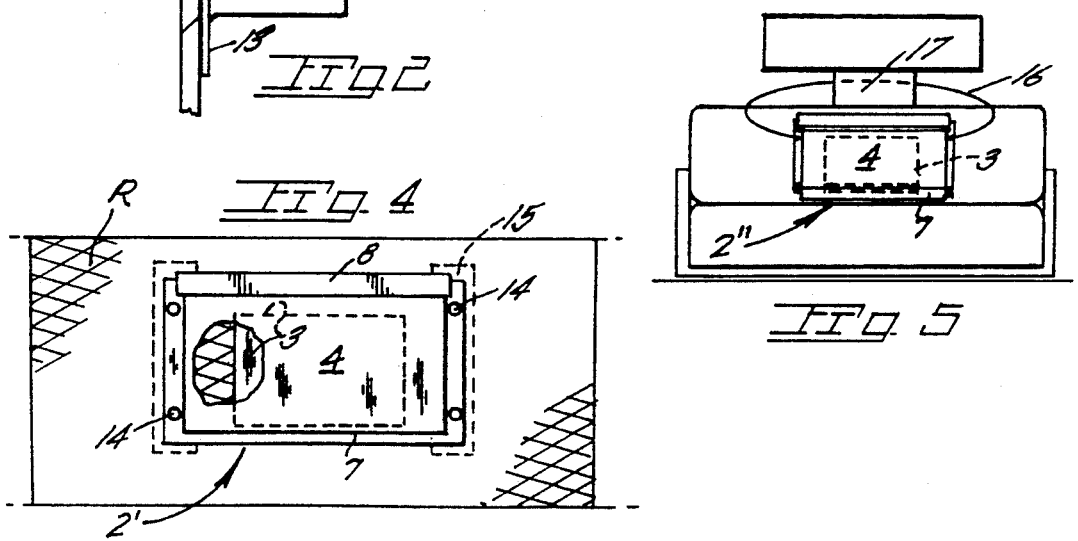

HEATER FACILITATING COLD ENGINE STARTS

BACKGROUND OF THE INVENTION

The present invention pertains generally to improvements facilitating starting of vehicle engines in cold weather.

In cold weather the starting of a reciprocating engine can result in the formation of ice in the induction system. Further, the vaporization of fuel is hindered by low air temperatures. Engine heat from an exhaust manifold is, of course, not available for engine starting.

U.S. Pat. No. 4,461,249 disclosed a system of utilizing engine coolant from a running engine to heat carburetor intake air of an engine being started. U.S. Pat. No. 4,548,186 discloses a system for providing a heat sink heated during engine operation to supply heat during a subsequent starting of the engine. Both of the above systems are of complex construction and entail considerable effort and modification of air intake components of an engine.

SUMMARY OF THE PRESENT INVENTION

The present invention is embodied in the provision of an encapsulated heat source in place within a housing for the heating of an engine or engine air intake components prior to starting of the engine.

The housing for the heat source may be mounted on an air filter housing or other air intake component, and when provided with the encapsulated heat source, is heated along with associated intake component to provide heated air at the initial stage of engine starting effort. Air occupying the filter housing as well as air drawn through the present housing is heated to the extent that engine starting is greatly enhanced. Accordingly cranking time is reduced along with resultant demands on the vehicle's electrical and starter systems. The heat source may be left in place after engine starting without adversely affecting engine operation. A preferred heat source is an encapsulated quantity of material such as sodium acetate which is reusable upon being subjected to a source of heat in between uses.

Important objectives of the present invention include the provision of a housing in place on an engine component of a vehicle for receiving a source of heat for heating ambient air drawn through the housing; the provision of a housing for placement on an engine component of the engine such as a component of the air intake system of an engine and which serves to conduct heat to associated components of the system which in turn heat air passing over component surfaces; the provision of a heater utilizing low cost, off the shelf encapsulated heat sources for placement in a receptacle provided with passageways through which supplemental ambient air may pass during engine starting and which air also partakes of heat from air intake system components heated indirectly by the heat source; the provision of a heat source and housing for attachment to an engine to preheat the engine prior to starting.

BRIEF DESCRIPTION OF THE DRAWINGS

In the drawings:

FIG. 1 is a front elevational view of the present heater in place on an air intake component of an engine;

FIG. 2 is an end elevational view of the heater taken along line 2—2 of FIG. 1 and is typical of the opposite end of the heater;

FIG. 3 is a plan view taken along line 3—3 of FIG. 1;

FIG. 4 is an elevational view of the present invention on an engine radiator;

FIG. 5 is an elevational view of the present device in place on an engine component.

DETAILED DESCRIPTION OF THE PREFERRED EMBODIMENTS

With continuing attention to the drawings, the applied reference numeral 1 therein indicates an air intake system component of an engine, which component, for example, may be an air filter housing.

Indicated generally at 2 is a heater housing or receptacle of the present invention into which a heat source 3 is deposited. The heater housing 2 includes a front wall 4, side walls 5 and 6, a bottom wall 7 and a closure 8 to define a chamber 9 in conjunction with the air filter housing 1. Pins 10 swingably mount closure 8 for access to chamber 9. Fastener elements at 12 attach flanges 13 of housing 2 to component 1.

Air inlets as at 11 are formed in the housing to admit ambient air for heating and subsequent entry into the engine induction system. Air entering the inlets 11 is heated by the encapsulated heat source 3, housing walls 4, 5, 6 and 7 and by the heated surfaces of filter housing 1. Opening at 1A in the air filter housing admits air during cranking of the engine, which air is subjected to filtering by an air filter element (not shown) in place in component 1.

In a typical starting operation, cranking will cause air to be drawn from the interior of heated air intake component 1. Heat radiated by component 1 will have raised the temperature of the air in said component several degrees to ensure the prevention of ice in a carburetor and enhance fuel vaporization. After the engine is operating, heating of intake air may be by a conventional means serving the engine. Engine intake air requirements at driving speeds will be provided by engine intake air components operating in the normal manner.

The heat source 3 is of the chemical type, encapsulated in a sealed packet and including a quantity of material such as sodium acetate which is reusable upon being subjected to heat as for example boiling water. One such type of heat source is that article manufactured and sold under the trademark THE HEAT -SOURCE by Prism Technology. Other such sources are well known to outdoorsmen and outdoor laborers who regularly use such heat sources for body warmth.

Other uses of the present heater include the installation of a heater at 2' on a vehicle radiator R for engine or transmission cooling with the heater serving to preheat the coolant or transmission oil for reducing the engine or transmission warm up period in cold climates. Fastener elements at 14 may pass through open areas of the radiator for engagement with a plate 15 on the rear side of the radiator.

An additional use of the present heater is the installation of a heater at 2" on an engine proper as shown in FIG. 5 wherein a wire harness at 16 on heater housing 2 encircles an engine component 17 such as a fuel metering component which alternatively could be a cylinder head component of an air cooled engine.

The present heat source 3 is installed in the housing a few minutes prior to an engine starting operation to permit the dispersion of heat to the heater housing and associated engine components. Air in the housing is of course heated to in turn heat air of a starting fuel/air mixture in the FIG. 1 version of the heater. Subsequent fuel/air mixtures benefit from ambient air being drawn through the heated housing 2 and the heated air filter housing 1.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. In combination with an engine having an air intake component, the improvement comprising,
    a housing having an openable closure and defining a chamber,
    means for attaching said housing to said engine, and a packet containing heat source material in said housing to facilitate starting of the engine, said packet being removable from said housing in order to actuate said packet.

2. The improvement claimed in claim 1 wherein said housing defines an air inlet, said chamber being in open communication with said air intake component of the engine.

3. The improvement claimed in claim 1 wherein said closure is movably mounted on said housing to facilitate removal and replacement of said packet.

4. The improvement claimed in claim 1 wherein said means for attaching said housing are fastener elements.

5. The improvement claimed in claim 1 wherein said means for attaching said housing is a harness for engagement with an engine component to permit attachment to the engine without alteration of the engine.

6. A heating device for attachment to an engine prior to starting of the engine, said device comprising,
    a housing including a closure movably mounted on said housing,
    means for attaching said housing to the engine, and
    a heat source packet in said housing, said heat source packet being removable from said housing in order to actuate the heat source packet.

7. The heating device claimed in claim 6 wherein said means for attaching are fastener elements.

8. The heating device claimed in claim 6 wherein said means for attaching is a harness for attachment of the housing to the engine without structural alteration of the latter.

9. The heating device claimed in claim 8 wherein said harness is of flexible material for engagement with one or more engine components in a detachable manner.

* * * * *